United States Patent
Thiel (10) Patent No.: US 12,291,697 B1
(45) Date of Patent: May 6, 2025

(54) CLEANING SOLUTION, DISPENSER THEREFOR AND A METHOD OF CLEANING A COFFEE MAKER

(71) Applicant: Stewart Anton Thiel, Mechanicsville, VA (US)

(72) Inventor: Stewart Anton Thiel, Mechanicsville, VA (US)

( * ) Notice: Subject to any disclaimer, the term of this patent is extended or adjusted under 35 U.S.C. 154(b) by 0 days.

(21) Appl. No.: 18/210,028

(22) Filed: Jun. 14, 2023

Related U.S. Application Data (60) Provisional application No. 63/388,584, filed on Jul. 12, 2022.

(51) Int. Cl.
| | |
|---|---|
| *C11D 3/395* | (2006.01) |
| *A47J 31/60* | (2006.01) |
| *C11D 11/04* | (2006.01) |
| *C25B 1/18* | (2006.01) |

(52) U.S. Cl.
CPC ............ *C11D 3/3953* (2013.01); *A47J 31/60* (2013.01); *C11D 11/04* (2013.01); *C25B 1/18* (2013.01); *C11D 2111/20* (2024.01)

(58) Field of Classification Search
CPC ... C11D 3/2953; C11D 11/04; C11D 2111/20; C11D 3/3953; A47J 31/60; C25B 1/18
See application file for complete search history.

(56) References Cited

U.S. PATENT DOCUMENTS

| | | | |
|---|---|---|---|
| 6,357,454 B1 * | 3/2002 | Yokota | C02F 1/4674 |
| | | | 134/167 C |
| 9,168,318 B2 | 10/2015 | Alimi | |
| 10,576,152 B2 | 3/2020 | Panicheva et al. | |
| 2002/0032141 A1 | 3/2002 | Harkins | |
| 2003/0083219 A1 | 5/2003 | Rees et al. | |
| 2014/0000658 A1 | 1/2014 | Koehneke | |
| 2022/0041315 A1 * | 2/2022 | Eddy | C25B 15/08 |

FOREIGN PATENT DOCUMENTS

| | | | |
|---|---|---|---|
| EP | 208211908 U | * | 12/2018 |
| WO | 2017075560 A2 | | 5/2017 |
| WO | 2021003419 A1 | | 1/2021 |
| WO | 2021053248 A1 | | 3/2021 |

OTHER PUBLICATIONS

Machine translation of CN208211908U (Year: 2018).*

* cited by examiner

*Primary Examiner* — Sharidan Carrillo
(74) *Attorney, Agent, or Firm* — John Rizvi; John Rizvi, P.A.—The Patent Professor ®

(57) ABSTRACT

A cleaning solution is provided which can effectively clean and remove bacteria from a coffee maker. The cleaning solution can comprise from about 0.04 weight percent to about 0.06 weight percent hypochlorous acid, with the balance being electrolyzed oxygenated water, and wherein the cleaning solution has a pH of from about 6.1 to about 7.2. There is also provided a method of cleaning a coffee maker and dispenser therefore. The method comprises providing at least 16 fluid ounces of the cleaning solution into a reservoir of a substantially empty coffee maker, starting a brew cycle on the coffee maker, and then optionally flushing the coffee maker with water.

6 Claims, 6 Drawing Sheets

CLEANING SOLUTION, DISPENSER THEREFOR AND A METHOD OF CLEANING A COFFEE MAKER

CROSS-REFERENCE TO RELATED APPLICATIONS

This application claims the benefit of Unites States Provisional Patent Application Ser. No. 63/388,584, filed on Jul. 12, 2022, which is incorporated by reference herein it is entirety.

FIELD OF THE INVENTION

The present invention relates generally to a cleaning solution, and more particularly, to a cleaning solution for coffee makers. The cleaning solution can safely clean and disinfect the components of coffee makers. There is also provided a dispenser for dispensing the cleaning solution.

BACKGROUND OF THE INVENTION

Coffee makers, be they commercial or residential coffee makers, contain various internal components, compartments, tubes, hose lines, and dispensing sections which are sealed or generally inaccessible to a user of the coffee maker. Since these sections of the coffee maker are sealed or generally inaccessible to the user, they present a challenge to cleaning.

This challenge is complicated by the fact that the use of coffee makers over time may cause moisture to be trapped within these various inaccessible components of the coffee maker. In addition, coffee particles and their organic components, or prepared coffee can also be retained in such components as well. Furthermore, certain sources of water used in coffee makers, e.g., hard water in some areas of the country, can have high levels of undesirable minerals which can also leave deposits inside various coffee maker components over time.

The presence of moisture, coffee particles, and various mineral deposits can lead to the development of bacteria, fungi and other unwanted organic matter that can live, hide, and thrive inside the components of the coffee maker. Some of these bacteria and fungi, if present in sufficient concentration, can be dangerous to human health. Most people are unaware of the extent to which the inner components of a coffee maker may become tainted with such bacteria over time.

The makers of coffee machines do appreciate that coffee maker machines would benefit from cleaning, but such makers of coffee machines realize that such cleaning is troublesome. Further, even though manufacturers do provide recommendations for cleaning, most people will usually not follow these cleaning instructions. Often coffee makers are located in communal areas such as break-rooms in various places of employment, and as such, they rarely receive the cleaning they require. The main reason being that people in a communal works space want to curtail the time they spend at the coffee machine. All of this often causes the maintenance and cleaning of many coffee makers to be overlooked.

In addition, even if people are aware of this situation, it is widely believed that the use of hot water alone can destroy bacteria in the coffee maker. But the retention of moisture in the coffee maker following hot water treatment provides for the ability for microbes to quickly reform after a hot water treatment. Others believe that a simple vinegar solution can effectively clean the innards of a coffee maker. Again, however, once the vinegar is flushed from the coffee maker, the internal components still retain the undesirable presence of moisture which can quickly re-produce the undesirable microbes. In addition, vinegar leaves an aftertaste that requires flushing with water multiple times to eradicate.

Some attempts to resolve this issue have been to provide for harsh cleaning solutions, such as bleach, which can contain components that can be undesirable from a health perspective. Other cleaning solutions can be caustic to the interior components of the coffee maker. Still further, certain cleaning solutions can be effective in disinfecting the coffee maker, yet still not be able to effectively remove organic matter or mineral deposits, which can over time, become tainted with bacteria yet again.

Accordingly, there remains a need for a solution to at least one of the aforementioned problems. For instance, there is an established need for a cleaning solution that effectively removes bacteria and mold from a coffee maker, while doing so in a safe and non-caustic manner.

SUMMARY OF THE INVENTION

In a first implementation of the invention there is provided herein a cleaning solution that can remove bacteria from a coffee maker, especially the inner components of a coffee maker which may be inaccessible and or sealed. The cleaning solution can comprise from about 0.04 weight percent to about 0.06 weight percent hypochlorous acid, with the balance being electrolyzed oxygenated water, and wherein the cleaning solutions has a pH of from about 6.1 to about 7.2.

The present invention is also directed to a method of cleaning a coffee maker, that can entail employing the cleaning solution described herein.

The present invention is also directed to a dispenser which comprises a hollow ball containing the cleaning solution which hollow ball has a hole for filling the hollow ball with the cleaning solution, and a cap. The cap can be a cork, screw off or flip-top type cap, amongst other known types of caps, which can be opened prior to dropping the ball dispenser in the water reservoir of the coffee maker, or prior to dispensing the contents of the dispenser into the water reservoir of the coffee maker.

In another aspect of the invention herein the hypochlorous acid may be present in the cleaning solution in an amount of from about 0.045 weight percent to about 0.055 weight percent, preferably from about 0.048 weight percent to about 0.052 weight percent, and most preferably about 0.05 weight percent. Such amounts of cleaning solution can also have alternative endpoints of such ranges of any one or more of about 0.040, 0.041, 0.042, 0.043, 0.044, 0.046, 0.047, 0.049, 0.051, 0.053, 0.054, 0.056. It will be understood that the range of the amount of hypochlorous acid can be a range that comprises about any of the aforementioned endpoints.

In yet another aspect of the invention herein the cleaning solution may comprise wherein the pH is from about 6.5 to about 7.2, preferably from about 6.8 to about 7.1 and most preferably about 7.0. Such endpoints of the pH range that is useful may also have alternative endpoints of such ranges of any one or more of about 6.6, 6.7, 6.9 and 7.3. It will be understood that the range of pH can be a range that comprises about any of the aforementioned endpoints.

In yet even another aspect of the invention herein the cleaning of solution described herein may be made by a process comprising electrochemically treating diluted brine with a pH of from about 6.1 to about 7.2. It will be understood herein that the pH of the diluted brine may have any of the aforementioned endpoints of pH described herein above.

In yet a further aspect of the invention, the process of electrochemically treating may comprise exposing a solution of from about 5 weight % to about 80 weight % diluted brine, preferably from about 10 weight % to about 75 weight % diluted brine, more preferably from about 15 weight % to about 70 weight % diluted brine, even more preferably from about 20 weight % to about 60 weight % diluted brine, to electrolysis. It will be understood herein that the aforementioned ranges of weight % of diluted brine may alternatively have alternative endpoints of any one or more of about 6, 7, 8, 9, 11, 12, 13, 14, 16, 17, 18, 19, 21, 22, 23, 24, 25, 30, 40, 50, 61, 62, 63, 64 and 65 weight %. In non-limiting embodiment, the brine may be obtained from seawater.

In an even further aspect of the invention, the step of electrochemically treating may comprise exposing a solution of from about 0.1% to about 5% by weight, preferably from about 0.5% by weight to about 4% by weight, more preferably from about 1.0% by weight to about 3% by weight of diluted brine to electrolysis. It will be understood herein that the aforementioned ranges of weight % of diluted brine may alternatively have alternative endpoints of any one or more of about 0.09% by weight, 0.11% by weight, 0.12% by weight, 0.13% by weight, 0.14% by weight, 0.15% by weight, 0.2% by weight, 0.3% by weight, 0.4% by weight. 0.6% by weight, 0.7% by weight, 0.8% by weight, 0.9% by weight, 1.1% by weight, 1.2% by weight, 1.3% by weight, 1.5% by weight, 1.7% by weight, 1.9% by weight. 2.0% by weight, 2.1% by weight, 2.3% by weight, 2.5% by weight. 2.7% by weight, 2.9% by weight, 3.1% by weight, 3.2% by weight, 3.3% by weight, 3.4% by weight, and 3.5% by weight. Any of the endpoints of the amounts noted above for the range of 0.1% to about 5% by weight can be combined with any of the endpoints noted above for the range of 5 weight to about 80 weight %.

In yet an even further aspect of the invention, the electrolysis may be conducted at from 2 volts to about 6 volts, preferably from about 2.5 to about 5 volts, more preferably from about 3 to about 4 volts, and most preferably about 3.2 volts. It will be understood herein that the aforementioned ranges of may alternatively have alternative endpoints of any one or more of volts of about 1.5., 1.8, 1.9. 2.1, 2.2, 2.3, 2.4, 2.6. 2.7, 2.8, 2.9, 3.1, 3.2, 3.3, 3.4, 3.5, 3.8, 3.9, 4.1, 4.3, 4.7, 4.9, 5.1, 5.2 and 5.3 volts.

In one other aspect of the invention, the cleaning solution may have a shelf life of at least 6 months, preferably at least 1 year, more preferably at least two years. The shelf life is determined to be expired, when the concentration of hypochlorous acid in the cleaning solution is more than, 5% less than that of the starting amount of hypochlorous acid, preferably 10% less than that of the starting amount of hypochlorous acid, and most preferably 15% less than that of the starting amount of hypochlorous acid.

In another aspect of the invention, the cleaning solution may be non-toxic. The term non-toxic may be understood to mean that it does not product personal injury or illness to humans when it is inhaled, swallowed or absorbed through the skin as so defined in the Consumer Product Safety Commission.

In yet another aspect of the invention, the cleaning solution may be non-caustic to the components of the coffee maker. This is understood to mean that it may not cause visible or operational damage to any of the components of the coffee maker after use, preferably after use one or more times.

In yet an even another aspect of the invention, the cleaning solution can contain free available chlorine (FAC) in an amount of from 80 times to 400 times, preferably from 100 times to 300 times, and most preferably from 120 time to 300 time more powerful than an equivalent concentration of bleach, i.e., sodium hypochlorite. In one embodiment, the FAC may be measured by methods known in the art, such as the DPD colorimeter method or other known methods established by government agencies, such as the Environmental Protection Agency. In the DPD colorimeter method, a yellow color may be formed by the reaction of free chlorine with N,N-diethyl-p-phenylenediamine (DPD) and the intensity is measured with a calibrated calorimeter that provides the output in parts per million. Further addition of potassium iodide turns the solution a pink color to provide the total chlorine value. The amount of bound chlorine present is then determined by subtracting free chlorine from the total chlorine.

In yet an even further aspect of the invention, the cleaning solution can be waste water friendly.

In yet an even still further aspect of the invention, the cleaning solution may be in the absence of any other components. For example, the cleaning solution can be in the absence of any one or more of harsh chemicals, such as hypochlorite and/or alcohol. Hypochlorite has a chlorine bleach smell that may linger after the cleaner is used.

In yet another aspect of the invention, the cleaning solution can also function as an effective descaler for coffee makers and the other devices and articles described herein.

In another aspect of the invention, the cleaning solution can be used to clean any one or more of coffee makers, reusable water containers, home seltzer/soda-maker bottles, hydration bladders, coffee mugs, water flossers, water pics, toothbrushes, CPAP equipment, beer taps, soda dispensers, beer or soda delivery lines, refrigerator water lines, water dispensers, baby bottles, dehumidifiers etc.

In yet another aspect of the invention there is provided a method of cleaning a coffee maker which may comprise employing the cleaning solution described herein.

In yet even another aspect of the invention, the method may comprise (1) providing at least 16 fluid ounces of the cleaning solution into a reservoir of a substantially empty coffee maker; (2) starting a brew cycle on the coffee maker; and, optionally, (3) flushing the coffee maker with 64 oz or more of water.

In another aspect of the invention, the method may comprise wherein after step (2) is finished the contents of the brew cycle as deposited in the coffee carafe are re-dispensed into the reservoir of the coffee maker and the brew cycle is repeated with the same and/or additional cleaning solution.

In yet another aspect, the method of repeating step (2) can be continued until there is less than 16 oz of cleaning solution left or until the coffee maker add water light is activated.

In yet even another aspect, the brew cycle used in the method can be the largest capacity brew cycle.

In another aspect, the method can be repeated at least once a year, preferably at least once every 6 months, more preferably at least every 3 months, even more preferably at least once a month, yet even more preferably at least once every week and most preferably, once a day.

In yet another aspect of the invention, the method may result in a decrease in the level of bacteria as tested by an ATP meter, in that a water run of the coffee maker after the use of the cleaning solution and the optional rinsing step, results in a water product that has less bacteria after the method is conducted than before the method is conducted.

Preferably the amount of bacteria may be at least about 10% less, more preferably at least about 20% less, even more preferably at least about 50% less, yet even more preferably at least about 75% less, still even more preferably at least about 100% less, and most preferably at least one of 200% less, 300% less and 500% less.

In yet even another aspect of the invention, there may be provided a dispenser which can comprise a hollow container, preferably a hollow ball, which may contain the cleaning solution which hollow ball has a hole for filling the hollow ball and a cap for closing the hole.

In another aspect of the invention, the cap can be a cork, screw on cap, or a flip-top type cap which can be opened prior to dropping the ball dispenser in the water reservoir or prior to emptying the contents of the dispenser into the reservoir.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1 and/or FIG. 5, unless expressed otherwise. Furthermore, there is no intention to be bound by any expressed or implied theory presented in the preceding technical field, background, brief summary or the following detailed description.

It is also to be understood that the specific devices illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "stable" may refer to the ability of the cleaning solution to remain suitable for its intended use, for example, in decontamination, disinfection, sterilization, and anti-microbial cleansing, for a specified period of time after its preparation under normal storage conditions (i.e., room temperature).

Shown throughout the figures, the present invention is directed toward a cleaning solution being present in a dispenser.

The cleaning solution as described herein can be effective in cleaning coffee makers that may contain one or more types of organisms that can be controlled, reduced, killed, or eradicated by treatment with the cleaning solution including bacteria, fungi, yeasts, and viruses. Examples of bacteria, are those such as, those selected from the group consisting of waterborne bacteria, such as *Campylobacter jejuni, Escherichia coli, Giardia lambia, Legionaella pneumophila, Salmonella enterica*, and others, as well as *Staphylococcus aureus, Staphylococcus epidermidis, Acinetobacter baumannii, Pseudomonas aeruginosa*, Enterobacteriaceae, *Salmonella bongori, Enterococcus faecium, Helicobacter pylori, Campylobacter* spp., *Streptococcus pneumoniae, Streptococcus mutans, Streptococcus gordonii, Streptococcus pyogenes, Shigella* spp., *Klebsiella pneumoniae, Clostridium difficile, Bacillus anthracis, Francisella tularensis, Burkholderia mallei, Burkholderia pseudomallei, Corynebacterium* spp., *Burkholderia cepacia, Burkholderia mallei, Burkholderia pseudomallei, Ralstonia pickettii*, and/or biofilm-forming bacteria found on aquatic surfaces, including Cobetia marina and others.

In one embodiment, the bacteria may be caused by algae and microalgae, including Euglenophyta, Chrysophyta, Pyrrophyta, Chlorophyta, Rhodophyta, Paeophyta, and/or Xanthophyta, macroalgae.

In another embodiment, the cleaning solution described herein may be a cleaning agent, a dispersant, a surfactant, a wetting agent, a wet edge enhancer, an emulsifier, a compatibilizer; and/or an anti-odor agent, a freshener, an agent to remove, disrupt, prevent and/or inhibit biofilm; agent to remove, disrupt, prevent and/or remove fouling; agent to remove, disrupt, prevent, and/or inhibit microbial growth and kill microorganisms, including bacteria, fungi, viruses, and other microorganisms.

The cleaning solution herein may also be suitable for use in controlling the activity of allergens present in the coffee maker. Household allergens that may be treated with the cleaning solution include, for example, animal fur, skin, and feces, household dust, weeds, grasses, trees, mites, and pollens. Animal allergens include, for example, cat epithelium, dog epithelium, horse dander, cow dander, dog dander, guinea pig epithelium, goose feathers, mouse epithelium, mouse urine, rat epithelium and rat urine.

Allergens that can be found in the workplace can include, for example, allergens such as natural proteins, which are generally derived from plant or animal proteins, and sometimes even chemicals, such as diisocyanates, and other material found in some clothing materials. Other chemical occupational allergens that may be present include, for example, anhydrides, antibiotics, wood dust and dyes. Many proteins may be occupational allergens including vegetable gums, enzymes, animal proteins, insects, plant proteins, and legumes.

Other allergens which can be treated by the cleaning solution herein are commonly known to those of ordinary skill in the art.

The cleaning solution herein may be used or applied in any suitable amount to provide the desired bactericidal, virucidal, germicidal and/or anti-allergenic effect, including the amounts described herein.

The cleaning solution herein may be better at cleaning and disinfecting as compared to cleaning with soap or other known cleaning solutions.

The cleaning solution described herein as obtained from electrolysis can provide the herein described amounts of hypochlorous acid. The electrolysis as described herein can entail a solution comprising anode water and cathode water. Anode water is produced in the anode chamber of the electrolysis cell. Cathode water is produced in the cathode chamber of the electrolysis cell.

Figure 1:
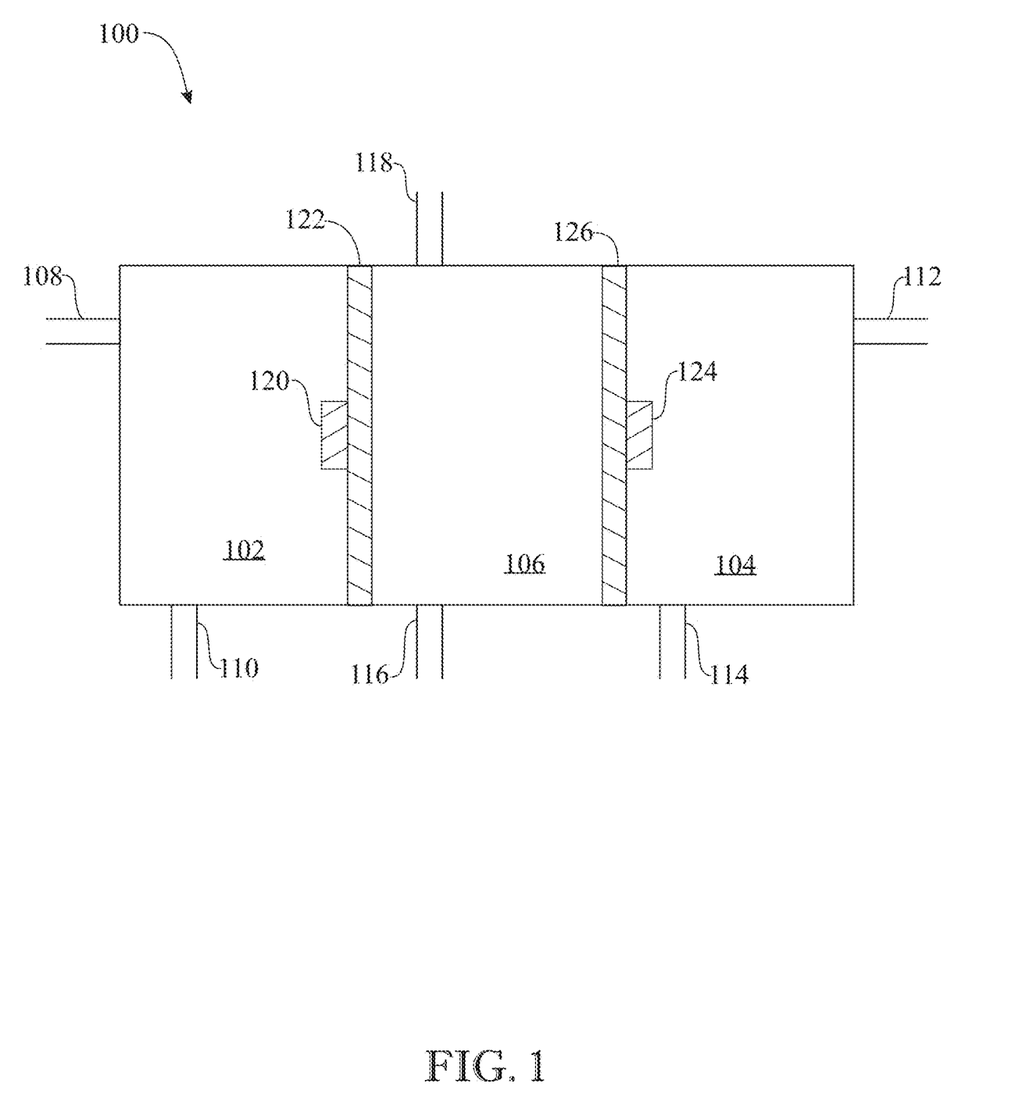
FIG. 1 presents a schematic view of an electrochemical cell used in the electrolysis of brine to make the cleaning solution described herein.

Referring initially to FIG. 1, there is provided one non-limiting example of an electrolysis cell 100. The electrolysis cell 100 has an anode chamber 102, cathode chamber 104 and ion exchange membrane chamber 106 between the anode chamber 102 and cathode chamber 104. The anode chamber 102 has an entry point 108 and exit point 110 to allow for the flow of water through the anode chamber 102. The cathode chamber 104 similarly has an entry point 112 and exit point 114 to permit the flow of water through the cathode chamber 104. The ion exchange membrane chamber 106 has an entry point 116 and an exit point 118. The electrolysis cell 100 preferably includes a container to hold all of the aforementioned components together.

The anode chamber 102 is separated from the ion exchange membrane chamber 106 by an anode electrode 120 and an anion exchange membrane 122. The anode electrode 120 may be positioned adjacent to the anode chamber 102 with the anion exchange membrane 122 located between the anode electrode 120 and the ion exchange chamber 106. While the anode electrode 120 is only depicted as being located along a part of the anion exchange membrane 122, in another embodiment the anode electrode 120 may run the entire planar length of the anion exchange membrane 122.

The cathode chamber 104 is separated from the ion exchange membrane chamber 106 by a cathode electrode 124 and a cathode ion exchange membrane 126. The cathode electrode 124 may be positioned adjacent to the cathode chamber 104 with the cathode ion exchange membrane 126 located between the cathode electrode 124 and the ion exchange membrane chamber 106. While the cathode electrode 124 is only depicted as being located along a part of the cathode exchange membrane 126, in another embodiment the cathode electrode 124 may run the entire planar length of the cathode ion exchange membrane 126.

The electrodes 120 and 124 can be made of any material to permit a voltage to be applied between the anode chamber 102 and cathode chamber 106. The cathode electrode 120 and the anode electrode 124 may be made of a material such as those selected from the carbon, titanium, hastelloy, nickel compound, etc. In particular, the outer peripheral surface of the cathode electrode 120 and the anode electrode 124 can have platinum (Pt) or iridium (Ir) having a thickness of about 2 to 3 micrometers (µm) coated thereon.

The metal electrodes 120 and 124 are generally planar. The electrodes 120 and 124 are configured to expose a substantial portion of the surface of the ion exchange membranes 122 and 126, respectively to the water in their respective anode chamber 102 and cathode chamber 104. This permits the migration of ionic species between the ion exchange membrane chamber 106, anode chamber 102 and cathode chamber 106. Preferably, the electrodes 120 and 124 have a plurality of holes (not shown) evenly spaced across the surface of the electrodes 120 and 124.

A source of electricity may be connected to the anode electrode 120 and cathode electrode 124 so as to induce a redox reaction between the anode chamber 102 and the cathode chamber 104. The source of electricity may in one embodiment be a direct current source of electricity such as a battery, preferably a 12-volt battery, or series of such batteries.

The ion exchange membranes 122 and 126 used in the electrolysis cell 100 may be constructed of any substance that will allow for the exchange of ions between the ion exchange membrane chamber 106 and the anode chamber 102, and between the ion exchange membrane chamber 106 and the cathode chamber 104.

While the anode ion exchange membrane 122 and cathode ion exchange membrane 126 may be made of the same material, it is preferable that the anode ion exchange membrane 122 and/or the cathode ion exchange membrane 126 be made of a fluorinated polymer. Suitable fluorinated polymers include, for example, perfluorosulfonic acid polymers and copolymers such as perfluorosulfonic acid/PTFE copolymers and perfluorosulfonic acid/TFE copolymers. The anode ion exchange membrane 122 and/or the cathode ion exchange membrane 126 may each be made up of a single layer of material or multiple layers of material.

The water for the anode chamber 102 and cathode chamber 104 of the electrolysis cell 100 may be any source of water. Preferably, the pretreated water has the herein described pH and can be any one or more of a water selected from the group consisting of softened water, purified water, distilled water, and deionized water. More preferably, the water source can be ultrapure water obtained using reverse osmosis processes which are known to those skilled in the art.

The salt water solution which is used in the ion exchange membrane chamber 106 may be any water-based salt solution that contains sufficient free available chlorine ions in water solution. Preferably, the salt water solution may be an aqueous sodium chloride (NaCl) salt solution, also commonly referred to as a brine solution. Other suitable salt solutions include other chloride salts such as potassium chloride, ammonium chloride and magnesium chloride as well as other halogen salts such as potassium and bromine salts. The salt solution may contain a mixture of any of the aforementioned salts.

The salt water solution may be of any suitable concentration. The salt water solution may be saturated or concentrated. Preferably, the salt water solution may be a saturated sodium chloride solution.

The various ionic species produced in the three chambered electrolysis cell useful in the invention can, upon application of a suitable electrical current to the anode electrode 120 and cathode electrode 124, be present in the salt solution flowing through the ion exchange membrane chamber 106 and migrate through the anode ion exchange membrane 122 and cathode ion exchange membrane 126 into the water flowing through the anode chamber 102 and cathode chamber 104, respectively.

Positive ions migrate from the salt solution through the ion exchange membrane chamber 106 to the cathode chamber 104. Negative ions migrate from the salt solution to the anode chamber 102.

Preferably, the salt solution is aqueous sodium chloride (NaCl) that contains both sodium ions (Na<+>) and chloride ions (Cl<−>) ions. Positive Na<+> ions migrate from the salt solution to the cathode chamber 104. Negative Cl<−> ions migrate from the salt solution to the anode chamber 102.

The sodium ions and chloride ions may undergo further reaction in the anode chamber 102 and cathode chamber 104. For example, chloride ions can react with various oxygen ions and other species (e.g., oxygen free radicals, $O_2$, $O_3$) present in the anode chamber 102 water to produce ClOn− and ClO<−>. Other reactions may also take place in the anode chamber 102 including the formation of oxygen free radicals, hydrogen ions (H<+>), oxygen (as $O_2$), ozone ($O_3$), and peroxides. In the cathode chamber 104, hydrogen gas ($H_2$), sodium hydroxide (NaOH), hydroxide ions (OH<−>), ClOn− ions, and other radicals may be formed.

The product of the redox reaction obtained from the electrolysis of the brine as described herein for the arrangement of components in FIG. 1 can be electrolyzed oxygenated water which has a pH as described herein, i.e., preferably from 6.1 to 7.2, most preferably about 7.0, and which may be used as the cleaning solution described herein without the addition or removal of any components therefrom, i.e., the cleaning solution may consist of the electrolyzed oxygenated water that has undergone electrolysis in the redox reaction structure described herein in FIG. 1.

The cleaning solution obtained from the electrolysis described herein can have any of the aforementioned properties. Preferably the cleaning solution is in the absence of any one of other optional components such as surfactants, dispersing agents, emulsifiers, other cleaning agents, phosphorous compounds, and the like.

Figure 2:
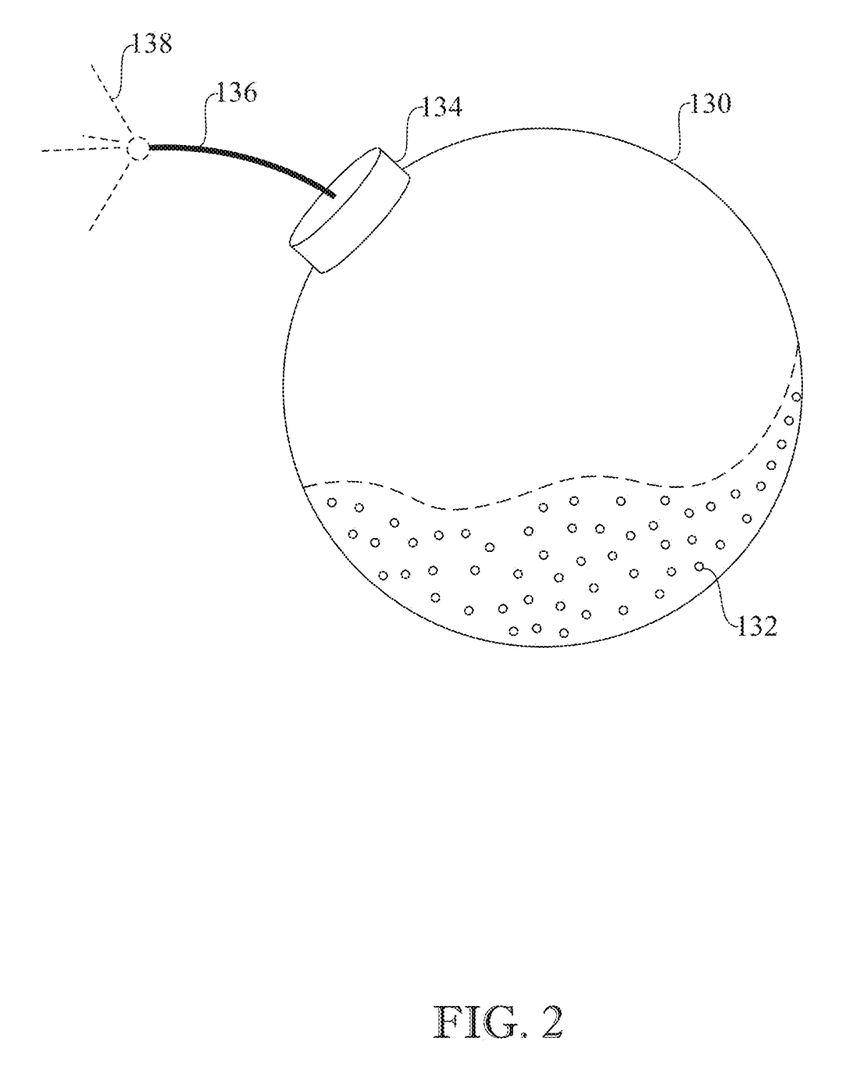
FIG. 2 presents a perspective view of a dispenser in accordance with a first embodiment of the present invention.

The cleaning solution described herein may be contained in a container of any kind, but may in one preferable embodiment, be a dispenser 130 such as that depicted in FIG. 2 herein.

Preferably, the dispenser 130 is of a hollow ball-shape such as depicted in FIG. 2, which ball-shape can be part of a fake cartoonish version of a bomb which is the dispenser 130. The cleaning solution 132 is retained inside the hollow dispenser 130.

The hollow dispenser 132 may have an opening 134. The opening 134 can be capped with any suitable type of cap 136, which can be a screw-on cap, a flip-type cap, or a cork stopper. The cap 136 can have a fake wick 136 thereon to provide an aesthetic appearance such as the aforementioned cartoonish version of a bomb. The wick 136 can terminate in a frayed end 138 which can make the wick 136 appear to be burning. The frayed end 138 can be made of frayed strings or plastic elements sticking out from the wick. In one embodiment, the cap 136 can be opened and the contents, i.e., the cleaning solution 132, may be dispensed as described herein.

Alternative embodiments of the dispenser 132 are also contemplated herein. Some such non-limiting examples of such alternative dispensers 132 can be squeeze bottles, or single-use containers, such as those used in single-serve coffee machines, such as those commonly employed in Keurig® machines.

The dispenser 130 may be made of any substance that is compatible with the cleaning solution 132. For example, the dispenser may be made of plastic, such as high-density polyethylene, polypropylene, polycarbonate, polyethylene terephthalate (PET), polyvinyl chloride (PVC), or other rigid plastics.

Figure 3:
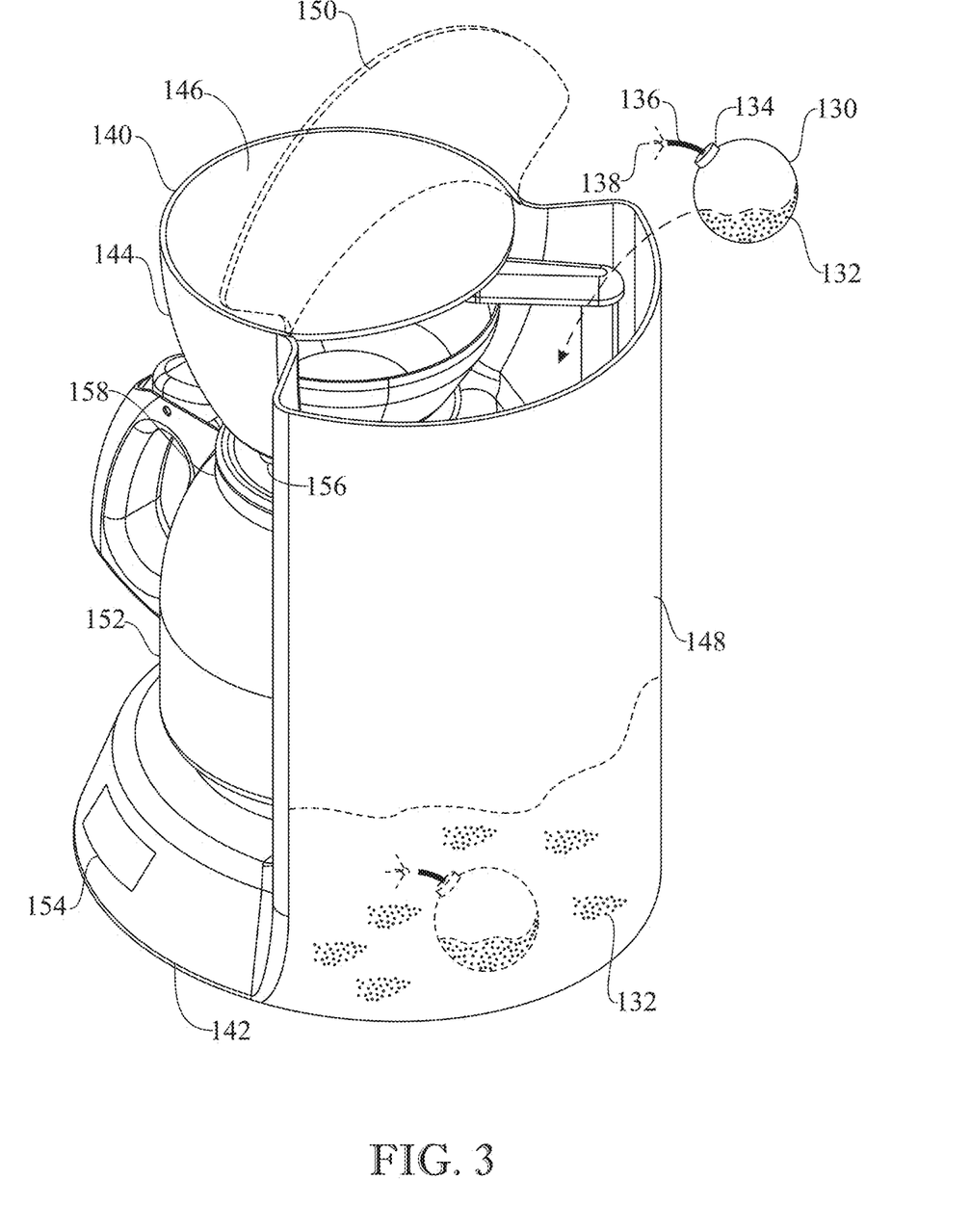
FIG. 3 presents a view of a dispenser being dispensed or placed in a reservoir of a coffee maker in accordance with another embodiment of the present invention.

Referring now to FIG. 3, there is provided a coffee maker 140. The coffee maker 140 includes a base 142, a brewing chamber 144, a brewing chamber lid 146, a reservoir 148, a reservoir lid 150, a carafe 152, and controls 154. The coffee maker 140 can provide a flow of hot water through a brewing material (e.g., coffee) to produce a brewed drink. The flow of water may be heated by one of any known means, for example, an electrical heating coil, inductive heating, or a conductive coating on tubing carrying the water.

During coffee making, oil eluted from the coffee tends to accumulate as a residue in the brewing chamber 144, the receiving port 156 existing in the lid 158 of the carafe 152, and the lid 158 of the coffee pot 32. In addition, water moving from the reservoir 148 through internal tubing (not shown) and into the inside of the brewing chamber lid 146 can leave moisture therein following use.

To clean all of the aforementioned areas of the coffee maker 140, the dispenser 130 containing the cleaning solution 132 can be dispensed into the reservoir 148 from the opening 134 of the dispenser 130. Then dispenser 130 as described herein preferably contains at least 16 fluid ounces of the cleaning solution 132. Thereafter, the controls 154 of the coffee maker 140 can be activated to initiate a brew cycle of the coffee maker 140, preferably the largest capacity brew cycle. Thus, the cleaning solution 132 dispensed into the reservoir 148 can be moved therefrom to the through the internal tubing (not shown) to the inside of brewing chamber lid 146 and through gravity therefrom into the brewing chamber 144, and thereafter to the receiving port 156 and thereafter the carafe 152 of the coffee maker 140. Thus, the cleaning solution 132 can move through all of the internal and visible components of the coffee maker 140 to achieve cleaning of those components.

Alternatively, the dispenser 130 can be dropped into the reservoir 148 in a manner which may permit the contents of the dispenser 130, i.e., the cleaning solution 132 to escape the dispenser 130 and spill into the reservoir, and thus, the above noted cleaning process can be conducted.

While FIG. 3 depicts a drip coffee maker, the cleaning solution 132 and the dispenser 130 can be used in any kind of coffee maker, such as for example, thermal coffee makers, pour-over coffee makers, single-serve capsule (pod) coffee makers, French press coffee makers, aero-press coffee makers, cold-brew coffee makers, espresso coffee makers, stovetop coffee makers, grind and brew coffee makers, Turkish coffee makers, steeped coffee makers, Vietnamese coffee makers, siphon coffee makers, percolator coffee makers, moka-pot coffee makers, chemex coffee makers, Ibrik coffee makers and cowboy coffee makers.

Figure 4:
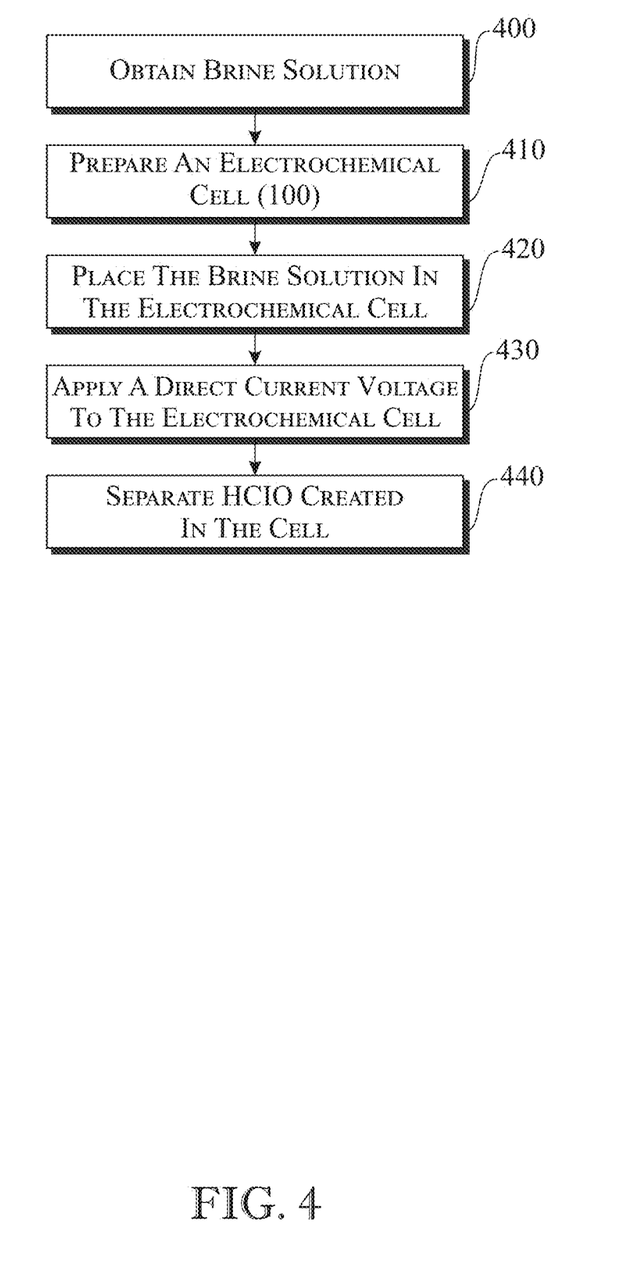
FIG. 4 presents a flowchart which recites the steps to making the cleaning solution.

Referring to FIG. 4, there is provided therein a flow chart which depicts the procedure for making the hypochlorous acid cleaning solution described herein. Beginning with a brine solution 400 as described herein, an electrochemical cell is prepared 410, such is deposited 420 into an electrochemical cell 100 such as described herein. Thereafter a direct voltage can be applied 430 to the electrochemical cell 100 which provides for the production of hypochlorous acid as described herein which can be separated 440 from the electrochemical cell 100.

Figure 5:
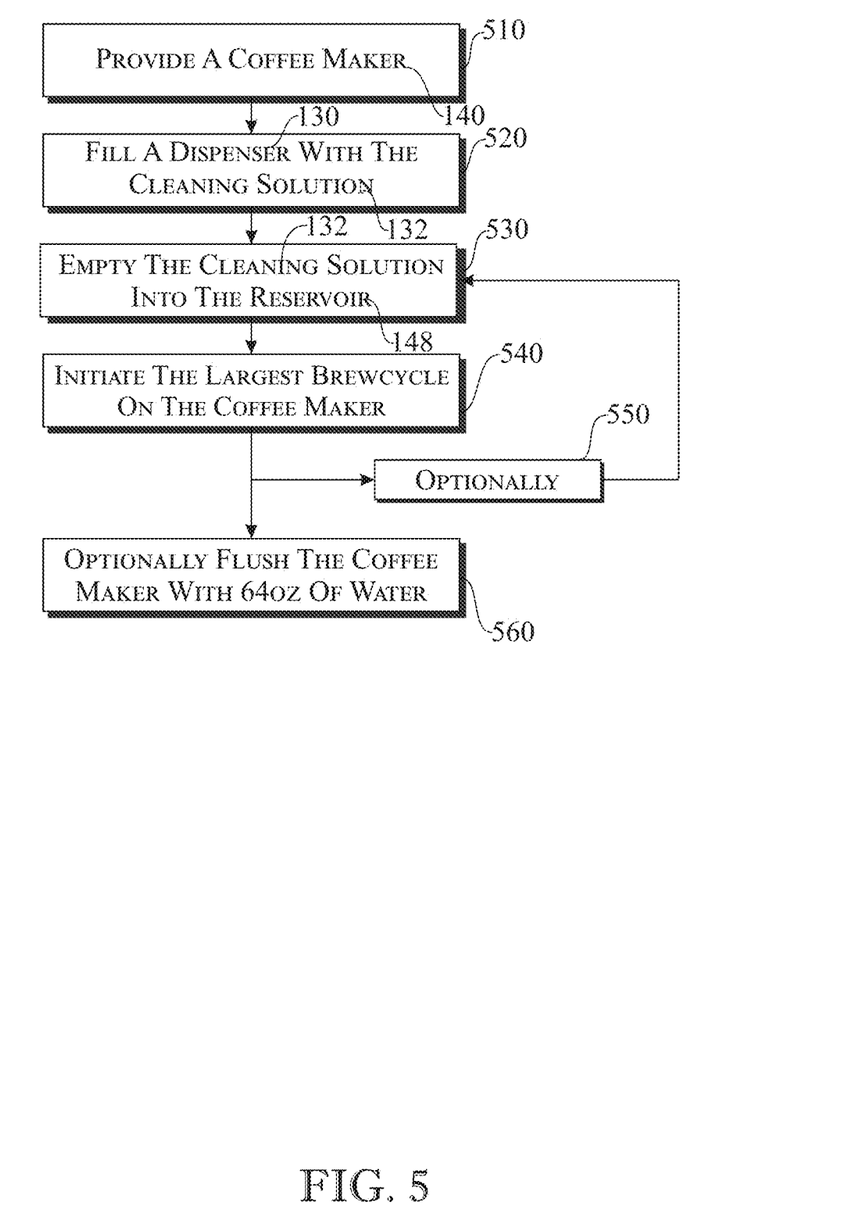
FIG. 5 presents a flowchart which recites the steps to use the cleaning solution as described in FIG. 3.

Referring to FIGS. 3 and 5, the coffee maker 140 can be provided 510. Then a dispenser 130 can be filled with the cleaning solution 520, preferably in a previous manufacturing step of making the dispenser 130. Then the dispenser 130 can have the opening 134 opened and the contents therein dispensed 530 in the reservoir 148 of the coffee maker 140. Thereafter the user can initiate the largest brew cycle 540 on the coffee maker 140. After completion of the brew cycle the contents of the carafe 152 can optionally be recycled back 550 into the reservoir 148 for another run of the cleaning cycle. The coffee maker 140 can also optionally be flushed with 64 oz of water 560 after the cleaning cycle.

Figure 6:
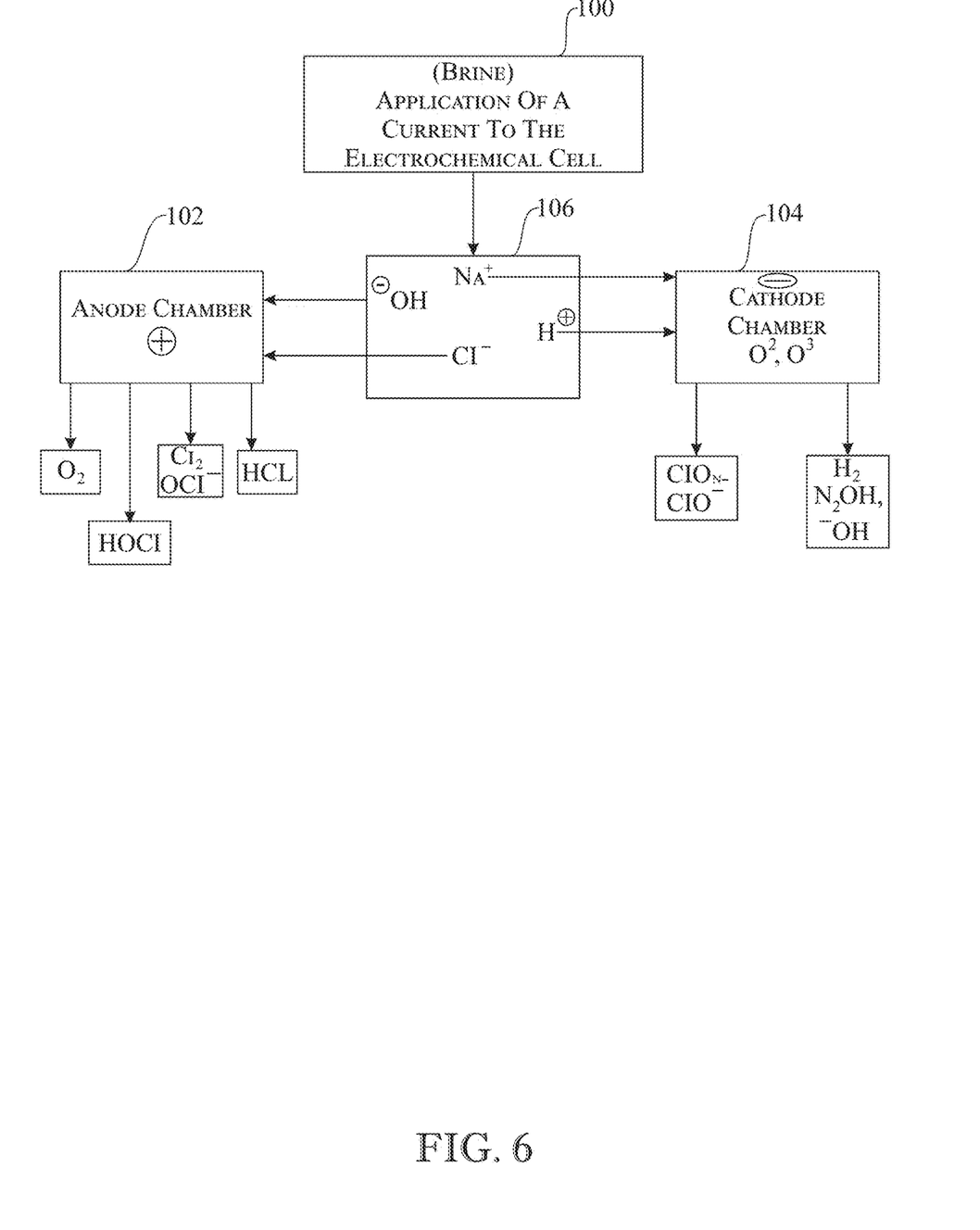
FIG. 6 presents a flowchart which visually describes the ion transfer and chemical reactions which occur in the electrochemical cell depicted in FIG. 1

Referring to FIGS. 1 and 6, a brine solution can be provided to the electrochemical cell which may result in the movement of the sodium cations towards the cathode chamber and the chloride ions anions towards the anode chamber as described herein above. The products produced in the anode chamber may be the hypochlorous acid of the present invention and side products such as oxygen, chlorine gas, and hydrochloric acid. The products of the cathode chamber may be chlorite ions, hydrogen gas and sodium hydroxide.

Alternative embodiments are contemplated in addition to the embodiments(s) shown and/or described herein. In an alternative embodiment, there is provided a dispenser 130 which can be in the shape and configuration of a single-use coffee dispenser commonly used in single-serve coffee makers such as those commonly made by Keurig®. The dispenser 130 can contain a cleaning solution 132 as described herein in a concentrated amount which can be placed in such a single-use coffee machine coffee pod insertion position. When the single-use coffee machine is run in a brew cycle for a single cup of coffee, and wherein the reservoir of the coffee machine contains an amount of fresh water sufficient to produce at least a single cup, preferably a full reservoir of fresh water, the running of the brew cycle can cause the single use coffee pod containing the cleaning solution to be pierced in the same manner as is done in most Keurig® machines, and wherein the contents of the pod are dispersed into the coffee machine to clean the inner contents and compartments of the single-use coffee machine.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A method of cleaning a coffee maker comprising:
   (1) providing at least 16 fluid ounces of a cleaning solution into a reservoir of an empty coffee maker, wherein the cleaning solution comprises from about 0.04 weight percent to about 0.06 weight percent hypochlorous acid with a balance of the cleaning solution being electrolyzed oxygenated water, and wherein the cleaning solution is in the absence of any other components, and wherein the cleaning solution has a pH of from 7.1 to about 7.3 and wherein the cleaning solution is made by a process comprising exposing a solution of from about 5 weight % to about 80 weight % diluted brine or a solution of from about 0.1% to about 5% by weight diluted brine to electrolysis, wherein the diluted brine used in the electrolysis is a solution of NaCl and KCl, and wherein the water used in the electrolysis is reverse osmosis treated water;
   (2) cleaning the coffee maker by starting a brew cycle on the coffee maker with the cleaning solution in the reservoir of the empty coffee maker; and,
   (3) flushing the coffee maker with 64 oz of water, and wherein the method is non toxic and non-caustic to the coffee maker and wherein the cleaning solution is waste-water friendly.

2. The method of claim 1, wherein the cleaning solution of step (1) is provided into the reservoir while it is in a dispenser which comprises a hollow ball which has a hole for filling the hollow ball with the cleaning solution and a cap.

3. The method of claim 1, wherein following the completion of step (2), the method further comprises taking contents of the brew cycle which were deposited in a coffee carafe are and re-dispensing the same into the reservoir of the coffee maker and repeating the brew cycle with the same and/or additional cleaning solution.

4. The method of claim 1, wherein the method of repeating step (2) can be continued until there is less than 16 oz of cleaning solution left or until the coffee maker add water light is activated.

5. The method of claim 1, wherein the brew cycle in step (2) can be the largest brew cycle available on the coffee maker.

6. The method of claim 1 wherein the diluted brine or a solution of 0.15 wt % diluted brine and about 4 volts of energy are used in the electrolysis.

* * * * *